(12) United States Patent
Kellner et al.

(10) Patent No.: US 11,811,033 B2
(45) Date of Patent: Nov. 7, 2023

(54) BATTERY ARRANGEMENT FOR ELECTRIC VEHICLE

(71) Applicant: Dr. Ing. h.c. F. Porsche Aktiengesellschaft, Stuttgart (DE)

(72) Inventors: Philipp Kellner, Rennigen (DE); Teiwen Fehse, Stuttgart (DE); Christopher Volkmer, Niefern-Öschelbronn (DE); Dominik Klaiber, Neuhausen (DE); Ralf Keller, Pforzheim (DE); Maximilian Müller, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 187 days.

(21) Appl. No.: 17/381,530

(22) Filed: Jul. 21, 2021

(65) Prior Publication Data
US 2022/0029215 A1  Jan. 27, 2022

(30) Foreign Application Priority Data

Jul. 22, 2020  (DE) ...................... 10 2020 119 287.8

(51) Int. Cl.
*H01M 10/48* (2006.01)
*H01M 50/249* (2021.01)
(Continued)

(52) U.S. Cl.
CPC ............. *H01M 10/488* (2013.01); *B60K 1/04* (2013.01); *H01M 10/482* (2013.01);
(Continued)

(58) Field of Classification Search
CPC ............. H01M 10/488; H01M 10/482; H01M 10/486; H01M 10/48; H01M 10/425;
(Continued)

(56) References Cited

U.S. PATENT DOCUMENTS 9,722,223 B1 * 8/2017 Maguire ................. B60L 50/64
10,276,901 B2 * 4/2019 Yao .................... H01M 10/4257
(Continued)

FOREIGN PATENT DOCUMENTS

DE  102010013017 A1  9/2011
DE  102014117313 A1  6/2016
(Continued)

OTHER PUBLICATIONS

Korean Notice of Preliminary Rejection for Korean Application No. 10-2021-0096160, dated Oct. 31, 2022 with translation, 8 pages.
(Continued)

*Primary Examiner* — Raymond Alejandro
(74) *Attorney, Agent, or Firm* — RatnerPrestia

(57) ABSTRACT

A battery arrangement for a motor vehicle, with a battery which has a battery housing and a plurality of battery cells. The battery cells are arranged in the battery housing. A protective plate is arranged at least on one side of the battery. A damage detection apparatus has a damage indicator. The damage indicator is arranged on the protective plate. The damage indicator is embedded into the protective plate.

17 Claims, 3 Drawing Sheets

(51) Int. Cl.
*H01M 50/242* (2021.01)
*B60K 1/04* (2019.01)

(52) U.S. Cl.
CPC ....... *H01M 50/242* (2021.01); *H01M 50/249* (2021.01); *B60K 2001/0438* (2013.01); *H01M 2220/20* (2013.01)

(58) Field of Classification Search
CPC .. H01M 50/249; H01M 50/242; H01M 50/24; H01M 2220/20; B60K 1/04; B60K 2001/0438
See application file for complete search history.

(56) References Cited

U.S. PATENT DOCUMENTS

| | | | |
|---|---|---|---|
| 10,355,322 | B2 | 7/2019 | Takatsuka et al. |
| 10,800,260 | B2 | 10/2020 | De Lira et al. |
| 2020/0161717 | A1 | 5/2020 | Fritz et al. |

FOREIGN PATENT DOCUMENTS

| | | |
|---|---|---|
| DE | 102017002383 A1 | 11/2017 |
| DE | 102017206663 A1 | 10/2018 |
| DE | 102018130881 A1 | 6/2020 |
| DE | 102019207435 A1 | 11/2020 |
| EP | 2887446 A1 | 6/2015 |
| JP | 2007059279 A | 3/2007 |
| JP | 2018046013 A | 3/2018 |
| WO | 0123224 A1 | 4/2001 |
| WO | 2016143399 A1 | 9/2016 |

OTHER PUBLICATIONS

Japanese Notice of Reasons for Refusal for Japanese Application No. 2021-120244, dated May 11, 2022, with translation, 5 pages.
Great Britain Combined Search and Examination Report for Great Britain Application No. GB2110480.7, dated Dec. 23, 2021, 3 pages.

* cited by examiner

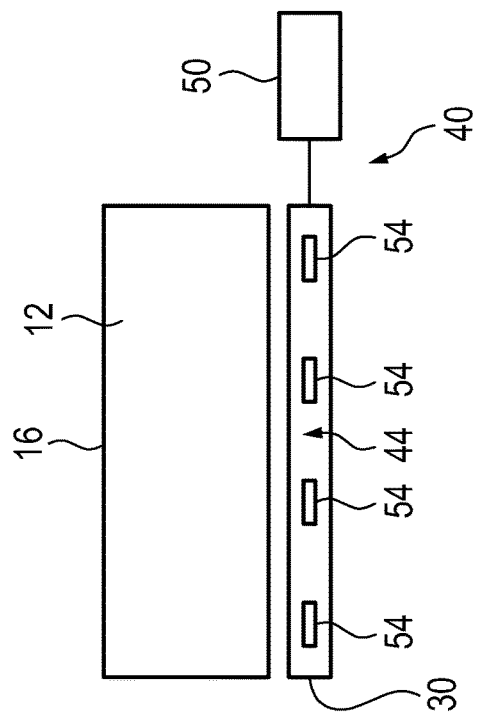
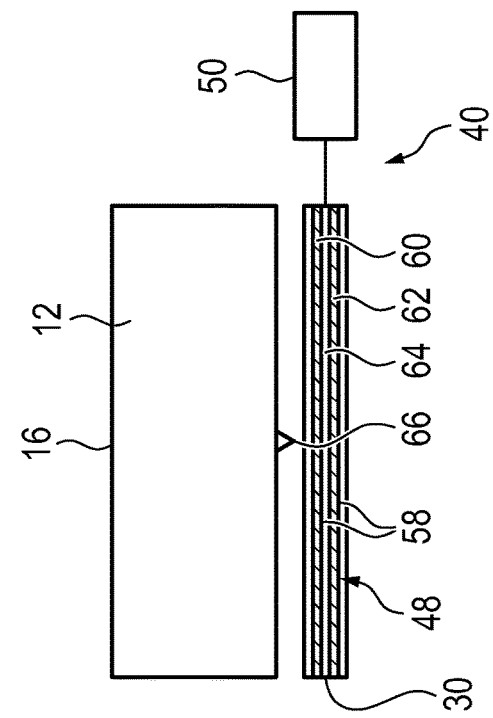
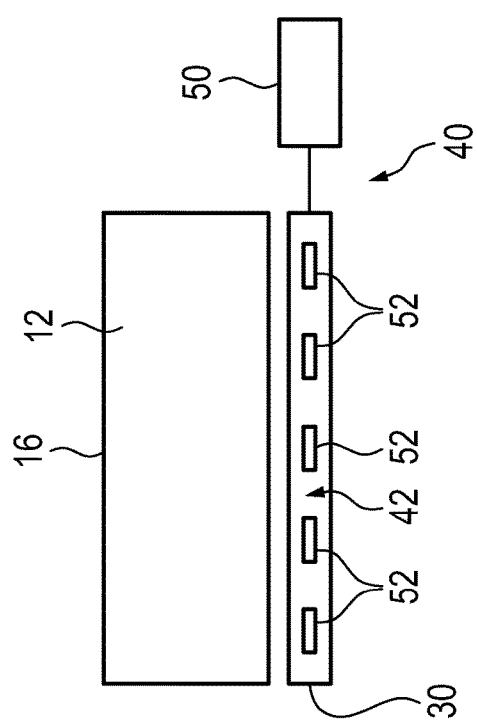
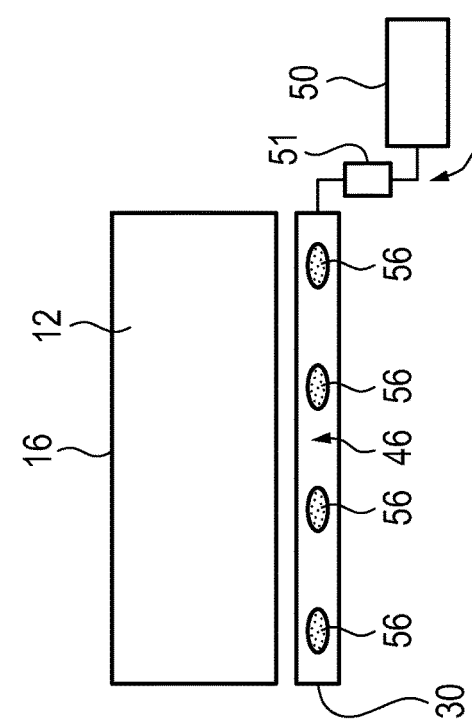

BATTERY ARRANGEMENT FOR ELECTRIC VEHICLE

CROSS-REFERENCE TO RELATED APPLICATION

This application claims priority to German Patent Application No. 10 2020 119 287.8, filed Jul. 22, 2020, the content of such application being incorporated by reference herein in its entirety.

FIELD OF THE INVENTION

The invention relates to a battery arrangement for a motor vehicle, with a battery which has a battery housing and a plurality of battery cells, the battery cells being arranged in the battery housing, a protective plate which is arranged at least on one side of the battery, and a damage detection apparatus which has a damage indicator means, the damage indicator means being arranged on the protective plate.

BACKGROUND OF THE INVENTION

Batteries of this type are usually used in the case of an electric vehicle, and serve for the storage of electric energy and the supply of a drive unit with electric energy in a driving operation. The batteries usually have a multiplicity of battery cells which are arranged in a battery housing and are connected electrically to one another. As an alternative, the battery cells are divided into a plurality of battery modules, the battery cells within the battery modules being connected electrically to one another, and the battery modules in turn being connected electrically to one another.

In order to provide the corresponding electric drive energy for a relatively high range of the electric vehicle, the batteries have a relatively large installation space requirement on account of the multiplicity of battery cells, the batteries as a rule being arranged on the underbody of the electric vehicle, since the required installation space is available on the underbody. The underbody batteries are usually protected by way of a protective plate against objects which are thrown up from the roadway; despite the protective plate, objects of this type might cause a deformation of the battery housing or might even penetrate through the battery housing and, as a result, the battery cells might be damaged. Here, the protective plate is deformed to a very great extent or is even penetrated by way of the object which is thrown up. Damage of the battery cells can lead to the venting of the battery cells and as much as a fire of the entire battery.

A failure of the battery is usually detected by way of a battery management system. A deformation of this type or a penetration of this type of the battery housing is, however, not detected immediately and is detected too late by way of the battery management system, since the relevant batteries might not yet be damaged significantly. Possibly, however, the battery cells are damaged in such a way that an imminent failure is to be feared or safety requirements are no longer met.

DE 10 2017 206 663 A1, which is incorporated by reference herein, discloses, for example, an electric vehicle with an underbody battery, the underbody battery being protected by way of a protective plate which is arranged between the underbody battery and a roadway against objects which are thrown up from the roadway. In order to increase the safety, the protective plate has a deformation sensor, by way of which active monitoring of the state of the protective plate takes place and, in this way, damage of the underbody battery is identified immediately by way of the detection of damage of the protective plate. The deformation sensor has an electrically conductive coating which is applied to the protective plate, an evaluation circuit detecting a resistance change of the deformation sensor.

SUMMARY OF THE INVENTION

It is a disadvantage of a deformation sensor of this type that the manufacturing complexity of the protective plate is increased by way of the application of the deformation sensor to the protective plate, the application operation requiring additional application apparatuses and being time-intensive.

The battery arrangement described herein provides increased safety and can nevertheless be realized simply and inexpensively.

The manufacturing complexity can be reduced by virtue of the fact that the damage indicator means is embedded into the protective plate, the damage indicator means being fixed on the protective plate during the manufacturing operation of the protective plate, and therefore being connected non-releasably to the protective plate. The protective plate is produced, in particular, by way of a casting method, the damage indicator means being inserted into a casting mold before the casting operation, and the material of the protective plate subsequently being filled into the casting mold. In the final, solidified state of the protective plate, the damage indicator means is fastened in the protective plate in a positively locking, non-positive and/or integrally joined manner. Therefore, an additional application or assembly step for providing a damage indicator means on the protective plate is dispensed with.

By way of the damage indicator means or by way of the damage detection apparatus, the driver of the electric vehicle can be informed promptly about damage of the protective plate and, as a result, about possible damage of the battery. Here, the driver can be instructed, for example, to immediately leave the vehicle or to find a repair shop urgently. In addition, suitable emergency measures can be initiated, for example an extended self-test of the battery cells, a disconnection of the damaged battery cells or a precautionary setting of the cooling system to maximum cooling power, in order, as a result, to reduce the risk of a fire of the battery pack. In this way, the safety and reliability of the electric vehicle can be increased by way of a protective plate of this type.

The protective plate is preferably configured in multiple layers, the damage indicator means being embedded into one of the layers of the protective element. A multiple-layer configuration serves to set the mechanical properties of a component to the corresponding application, it being possible, for example, for different materials, for example metals and plastics, or layers of different configuration which are made from a single material group, in particular from the material group of plastics, to be combined with one another, in order to provide mechanical properties which cannot be met or can only be met in a complicated and expensive way by way of a single material. As a result, in the case of a protective plate, a high strength and a high damping property can be realized, in particular. The damage indicator means is embedded into one of the layers.

In one preferred refinement, the protective plate is configured at least in three layers, the layer which has the damage indicator means being arranged in a sandwich-like manner between two other layers. As a result, the damage indicator means or the layer which has the damage indicator means can be protected against environmental influences and damage, as a result of which the function of the damage indicator means can be ensured.

The protective plate preferably has at least one layer which is made from a fiber reinforced plastic, as a result of which the protective plate has a relatively high strength and ensures protection of the battery even in the case of relatively high forces which act on the protective plate.

In one preferred refinement, the protective plate has at least one layer which is made from a structural foam. As a result, the protective plate has a layer which damps an impact of an object on the protective plate and, as a result, reduces the risk of damage of the battery.

The damage indicator means preferably has at least one strain gage. As a result, the deformation of the protective plate can be detected in a simple and particularly inexpensive way. The measurement by means of strain gage is based on the principle that conductor tracks which are embedded in the protective plate change their electric resistance in the case of very small mechanical stresses, the electric resistance being detected and being evaluated by way of an evaluation unit. In the case of a deformation of the protective plate, the embedded conductor tracks are also deformed, with the result that the electric resistance of the conductor tracks changes and a deformation of the protective plate is detected.

The damage indicator means preferably has at least one optical spacing sensor, it being possible for the spacing between the protective plate and the battery to be detected by way of the spacing sensor, and it being possible for damage of the protective plate to be detected by way of a change of the spacing between the protective plate and the battery. The spacing sensor is a displacement sensor which is known from the prior art, for example an ultrasonic sensor. Here, the protective plate and the spacing sensor which is integrated into the protective plate are mounted at a fixed spacing from the battery, that is to say from an outer face of the battery housing, which outer face faces the protective plate. In the case of damage, in particular deformation, of the protective plate, the spacing between the protective plate and the battery changes, the spacing change being detected by way of the damage indicator means and being processed by way of a corresponding signal processing unit to form an output signal, for example to the driver. The spacing change can be both a spacing reduction and a spacing increase, for example in the case of tilting of the protective plate.

In one preferred refinement, the damage indicator means has at least one chamber which is filled with a fluid, it being possible for an outflow of the fluid which is caused by way of damage of the protective plate to be detected. At least one chamber is provided in the protective plate, the protective plate being ruptured by way of the deformation or a penetration of the protective plate, and the chamber being connected to the surroundings, with the result that the fluid escapes from the chamber. The escaping fluid is detected by way of a sensor, the signal of the sensor being processed and, for example, being converted into a warning signal to the driver. The fluid can be a liquid or gas, the gas being, for example, smoke which is produced on account of a chemical reaction in the case of damage of the protective plate. As a result, the damage of the protective plate can be detected in a simple and inexpensive way.

The damage indicator means preferably has an electrically conducting element which can be severed by way of a penetration element which is arranged on the battery. A check of the electric conductivity takes place continuously on the electrically conducting element. If the protective plate is damaged in such a way that the spacing between the protective plate and the battery is reduced and the penetration element penetrates into the protective plate, the electrically conducting element is severed, as a result of which the electric conductivity decreases. In one preferred refinement, the damage indicator means has a plurality of electrically conducting elements which are spaced apart from one another in the thickness direction by way of electrically non-conducting insulation elements, it being possible for the extent of the damage of the protective plate to be determined in a manner which is dependent on the penetration depth of the penetration element which is arranged on the battery. As a result, the extent of the damage of the protective plate can be determined, and a reaction can be output in a manner which is dependent on the extent of the damage.

The damage indicator means preferably extends flatly over the entire protective plate. As a result, a deformation of the protective plate can be detected in all regions of the protective plate. The damage indicator means can be, for example, a sensor film.

In one preferred refinement, the damage detection apparatus has an evaluation unit which is operatively connected to the damage indicator means. The evaluation unit serves for the evaluation of the signals of the damage indicator means, the evaluation unit generating, for example, a warning signal to the driver, or initiating predefined safety measures of the electric vehicle.

The protective plate is preferably arranged between a side of the battery, which side faces a roadway, and the roadway. In respect of the advantages of the invention, reference is made to the preceding paragraphs.

Damage of the battery can be detected reliably and in good time by way of a configuration of this type of the battery arrangement, it being possible for the damage detection to be realized with low manufacturing and assembly complexity.

BRIEF DESCRIPTION OF THE DRAWING FIGURES

One exemplary embodiment of the invention will be described in greater detail on the basis of the drawings.

FIG. 2a shows a first embodiment of a battery arrangement,

FIG. 2b shows a second embodiment of the battery arrangement,

FIG. 2c shows a third embodiment of a battery arrangement,

FIG. 2d shows a fourth embodiment of a battery arrangement, and

DETAILED DESCRIPTION OF THE INVENTION

Figure 1:
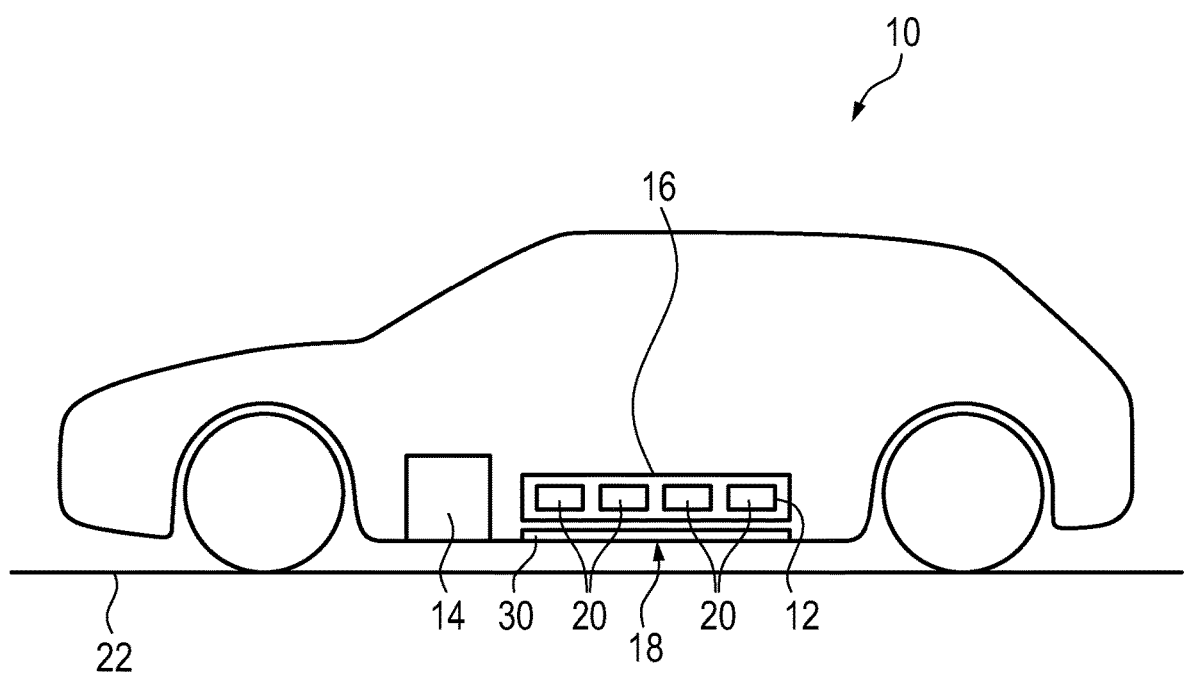
FIG. 1 shows a diagrammatically illustrated electric vehicle.

FIG. 1 shows a diagrammatic illustration of an electric vehicle 10 which has a battery 12 and a drive unit 14. The battery 12 serves for the storage of electric energy and the supply of the drive unit 14 with electric energy in a driving operation of the electric vehicle 10.

The battery 12 has a battery housing 16 and is arranged on the underbody 18 of the electric vehicle 10. A multiplicity of battery cells 20 are arranged in the battery housing 16, which battery cells 20 are separated in a fluid-tight manner from the external surroundings by way of the battery housing 16, and are therefore protected against environmental influences by way of the battery housing 16. A protective plate 30 is arranged below the battery 12, that is to say between the battery 12 and a roadway 22. The protective plate 30 is fastened to a motor vehicle body, and covers the battery 12 completely as viewed from the roadway 22.

The purpose of the protective plate 30 is that, in a driving operation of the electric vehicle 10, an object which lies on the roadway and is thrown up bounces against the protective plate 30. In this way, the battery 12 and the battery housing 16 are protected by way of the protective plate 30 against objects which are thrown up, as a result of which the risk of damage of the battery 12 is reduced.

Despite the protective plate 30, the battery 12 and, in particular, battery cells 20 can be damaged by way of objects which are driven over or are on the roadway 22 and are thrown up, by the protective plate 30 being deformed greatly or punctured.

In the case of damage of the battery cells 20, the driver of the electric vehicle 10 has to be informed about this as rapidly as possible and/or corresponding measures have to be initiated, in order to prevent, in particular, a fire of the battery 12 or even of the entire electric vehicle 10.

The detection of possible damage of the battery 12 takes place via a damage detection apparatus 40. FIGS. 2a, 2b, 2c and 2d show a damage detection apparatus 40 of this type, the damage detection apparatus 40 comprising a damage indicator means 42, 44, 46, 48 and an evaluation unit 50. The evaluation unit 50 is connected in terms of signals to the damage indicator means 42, 44, 46, 48, the evaluation unit 50 receiving the signals of the damage indicator means 42, 44, 46, 48, evaluating them, and initiating corresponding measures, such as switching off of the battery 12 or outputting of a message to the driver about the damage of the battery 12. The damage indicator means 42, 44, 46, 48 extends over the entire area of the protective plate 30.

Figure 3:
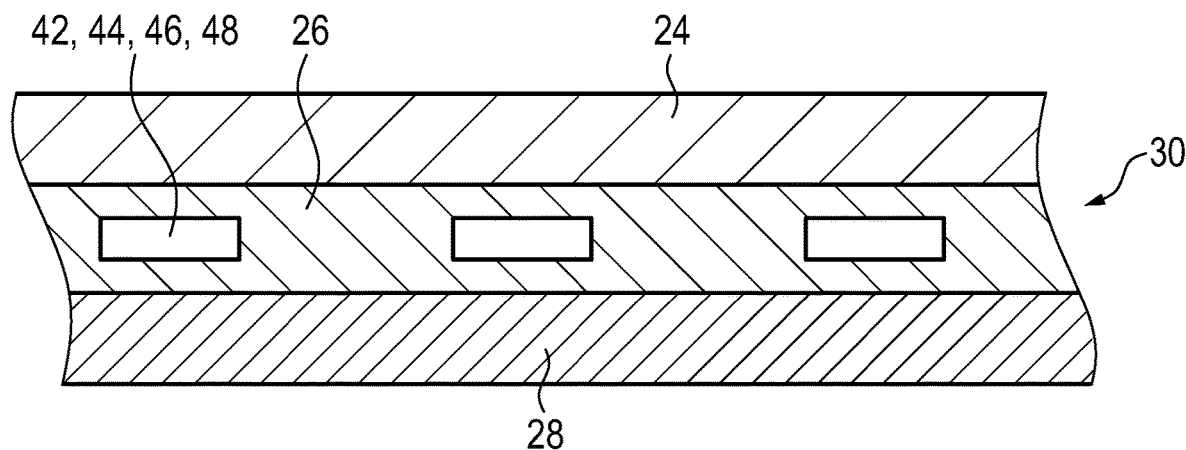
FIG. 3 shows a detail of a protective plate.

According to aspects of the invention, the damage indicator means 42, 44, 46, 48 is embedded in the protective plate 30. The protective plate 30 is produced from plastic and, as shown in FIG. 3, is produced in multiple layers. A first layer 24 is produced from a fiber reinforced plastic, and serves for the strength of the protective plate 30. In a second layer 26, the damage indicator means 42, 44, 46, 48 is embedded, the damage indicator means 42, 44, 46, 48 having already been inserted into the production mold and overmolded in the production method of the second layer 26. A third layer 28 adjoins the second layer 26, and is produced from a plastic foam. The impact of an object can be damped by way of the third layer 28.

FIGS. 2a, 2b, 2c and 2d show different embodiments of the damage indicator means 42, 44, 46, 48.

In FIG. 2a, the damage indicator means 42 has a plurality of strain gages 52 which are arranged fixedly on the protective plate 30. The strain gages 52 have at least one conductor track which changes its electric resistance in the case of very low mechanical stresses. The change of the electric resistance is detected and evaluated by way of the evaluation unit 50. In the case of a deformation of the protective plate 30, the conductor tracks of the strain gages 52 are also deformed, with the result that the electric resistance of the conductor tracks is changed and a deformation of the protective plate 30 is detected.

In FIG. 2b, the damage indicator means 44 has a plurality of optical spacing sensors 54 which are directed toward the battery housing 16 and detect the spacing between the protective plate 30 and that outer face of the battery housing 16 which faces the protective plate 30. The optical spacing sensors 54 are connected in signal terms to the evaluation unit 50. In the case of a deformation of the protective plate 30, the spacing between the protective plate 30 and the battery housing 16 changes, the spacing change being detected by way of the spacing sensors 54 and, as a result, a deformation of the protective plate 30 and possible damage of the battery 12 being detected.

In FIG. 2c, the damage indicator means 46 has a plurality of chambers 56 which are filled with a fluid. In the case of damage of the protective plate 30, the fluid flows out of the chambers 56, or the pressure in the chambers 56 is increased. The pressure increase in the chambers 56 or the leakage from the chambers 56 is monitored by way of a sensor 51, the sensor 51 being connected in signal terms to the evaluation unit 50 and evaluating the signals of the sensor 51.

In FIG. 2d, the damage indicator means 48 has a plurality of electrically conducting conductors 60, 62 which are separated from one another in the thickness direction by way of a non-electrically conducting layer 64. The conductor 60 is arranged closer to the battery 12 than the conductor 62. Furthermore, a disconnecting unit 66 which is arranged on the battery 12 and which protrudes into the gap between the battery 12 and the protective plate 30 is provided. The electrically conducting conductors 60, 62 are connected in signal terms to the evaluation unit 50, the evaluation unit 50 monitoring the electric conductivity of the conductors 60, 62. In the case of a deformation of the protective plate 30, the disconnecting unit 66 penetrates into the protective plate 30 and either severs both the conductors 60, 62 or only the conductor 60 in a manner which is dependent on the extent of the deformation. As a result of the severing of at least one of the conductors 60, 62, the electric conductivity of the conductors 60, 62 changes, and damage of the protective plate 30 is detected. If only the conductor 60 is severed, there is a slight deformation of the protective plate 30. If the two conductors 60, 62 are severed, there is a pronounced deformation of the protective plate 30.

By way of the detection of the deformation of the protective plate 30, an impact on the protective plate 30 and, as a result, possible damage of the battery 12 are detected reliably and in good time. If a deformation of this type of the protective plate 30 is detected, the driver is informed that a check of the battery 12 for damage should take place. In this way, a fire of the battery 12 or the entire electric vehicle 10 on account of ignition of the damaged battery 12 can be prevented reliably.

Other structural embodiments, which fall within the scope of protection of the main claim than the embodiments which are described, are possible. For example, the battery 12 might be of different configuration.

What is claimed:

1. A battery arrangement for a motor vehicle, said battery arrangement comprising:
    a battery having a battery housing and a plurality of battery cells arranged in the battery housing,
    a protective plate arranged at least on one side of the battery, wherein the protective plate has multiple layers including a molded substrate layer to which remaining layers of the multiple layers are mounted, and
    a damage detection apparatus having a damage indicator embedded in the molded substrate layer of the protective plate.

2. The battery arrangement as claimed in claim 1, wherein the protective plate has at least three layers, wherein the molded substrate layer of the three layers includes the damage indicator, and said one layer being arranged in a sandwich-like manner between the two other layers of the three layers.

3. The battery arrangement as claimed in claim 2, wherein at least one of the three layers is made from a fiber reinforced plastic.

4. The battery arrangement as claimed in claim 2, wherein at least one of the three layers is made from a structural foam.

5. The battery arrangement as claimed in claim 1, wherein the damage indicator comprises at least one strain gage.

6. The battery arrangement as claimed in claim 1, wherein the damage indicator has at least one optical spacing sensor that is configured to detect a spacing between the protective plate and the battery, and the damage detection apparatus is configured to detect damage to the protective plate by way of a change of the spacing between the protective plate and the battery.

7. The battery arrangement as claimed in claim 1, wherein the damage indicator has at least one fluid-filled chamber and the damage indicator is configured to detect an outflow of the fluid which is caused by way of damage to the protective plate.

8. The battery arrangement as claimed in claim 1, wherein the damage indicator has an electrically conducting element which is configured to be severed by way of a penetration element which is arranged on the battery.

9. The battery arrangement as claimed in claim 8, wherein the damage indicator has a plurality of the electrically conducting elements which are spaced apart from one another in a thickness direction by way of electrically non-conducting insulation elements, the damage detection apparatus being configured to determine an extent of damage to the protective plate in a manner which is dependent on a penetration depth of the penetration element which is arranged on the battery.

10. The battery arrangement as claimed in claim 1, wherein the damage indicator extends flatly over an entire area of the protective plate.

11. The battery arrangement as claimed in claim 1, wherein the damage detection apparatus comprises an evaluation unit which is operatively connected to the damage indicator.

12. The battery arrangement as claimed in claim 1, wherein the protective plate comprises a top surface and a bottom surface, said top surface facing the battery housing and said bottom surface facing a roadway, wherein each of the top surface and the bottom surface is parallel to the roadway, and wherein the damage indicator is arranged between the top surface and the bottom surface of the protective plate.

13. The battery arrangement as claimed in claim 1, wherein the damage indicator is embedded and overmolded into the molded substrate layer.

14. The battery arrangement as claimed in claim 1, wherein the damage indicator is spaced apart from a top surface of the molded substrate layer to which one of said remaining layers is mounted, and wherein the damage indicator is spaced apart from a bottom surface of the molded substrate layer to which another of said remaining layers is mounted.

15. The battery arrangement as claimed in claim 1, wherein the molded substrate layer is sandwiched between said remaining layers.

16. An electric vehicle with the battery arrangement as claimed in claim 1.

17. The electric vehicle as claimed in claim 16, wherein the protective plate is arranged between (i) a side of the battery facing a roadway and (ii) the roadway.

* * * * *